United States Patent
Bates et al.

(10) Patent No.: US 7,765,218 B2
(45) Date of Patent: Jul. 27, 2010

(54) DETERMINING A TERM SCORE FOR AN ANIMATED GRAPHICS FILE

(75) Inventors: Cary Lee Bates, Rochester, MN (US); Brian Paul Wallenfelt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1700 days.

(21) Appl. No.: 10/955,743

(22) Filed: Sep. 30, 2004

(65) Prior Publication Data

US 2006/0069584 A1 Mar. 30, 2006

(51) Int. Cl.
- G06F 7/00 (2006.01)
- G06F 17/30 (2006.01)
- G06Q 10/00 (2006.01)

(52) U.S. Cl. .................. 707/752; 705/1.1; 715/200
(58) Field of Classification Search .................. None
See application file for complete search history.

(56) References Cited

U.S. PATENT DOCUMENTS

| | | | | |
|---|---|---|---|---|
| 5,019,804 | A * | 5/1991 | Fraden | 340/562 |
| 5,037,265 | A * | 8/1991 | O'Brien | 414/373 |
| 5,490,060 | A * | 2/1996 | Malec et al. | 705/10 |
| 5,497,314 | A * | 3/1996 | Novak | 705/17 |
| 5,651,115 | A * | 7/1997 | Hasebe et al. | 725/115 |
| 6,374,260 | B1 * | 4/2002 | Hoffert et al. | 707/104.1 |
| 2003/0167240 | A1 * | 9/2003 | Napier et al. | 705/404 |
| 2004/0255249 | A1 * | 12/2004 | Chang et al. | 715/723 |

OTHER PUBLICATIONS

Devanshu Shyani; A survery of Web Metrics; 2002; ACM;pp. 8-26.*
Eugene J. Guglielmo; Natural-Language Retrieval of Images; 1996; pp. 9-30.*
Sergey Brin and Lawrence Page, The Anatomy of a Large-Scale Hypertextual Web Search Engine, http://www-db.stanford.edu/~backrub/google.html, Aug. 27, 2004, pp. 1-18.
Ian Rogers, Page Rank Explained, The Google Pagerank Algorithm and How It Works, http://www.iprcom.com/papers/pagerank/, Aug. 27, 2004, pp. 1-26.

* cited by examiner

*Primary Examiner*—Neveen Abel Jalil
*Assistant Examiner*—Jermaine Mincey
(74) *Attorney, Agent, or Firm*—Owen J. Gamon

(57) ABSTRACT

A method, apparatus, system, and signal-bearing medium that, in an embodiment, determine a term score based on frame scores, frame weights, and effect bonuses. The frame score represents a probability that the frame will be displayed, and in an embodiment is based on whether the frame may be skipped via an embedded link between frames. Frames that may be skipped have their frame scores reduced. The frame weights are based on an attribute of the term, such as a font size, a font style, a color, or a location within a frame. The effect bonus is based on one or more attributes of the nearest tweened object to the term, such as a location, a size, a shape, or a color. The term score may be used to order the display of the pages that contain the frames in response to a search request. In this way, terms within the frames of an animated graphics file are scored based on the likelihood that the term will be seen during the animation.

16 Claims, 8 Drawing Sheets

DETERMINING A TERM SCORE FOR AN ANIMATED GRAPHICS FILE

FIELD

An embodiment of the invention generally relates to computers. In particular, an embodiment of the invention generally relates to determining a score for a term in frames of an animated graphics file.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Years ago, computers were isolated devices that did not communicate with each other. But, today computers are often connected in networks, such as the Internet or World Wide Web, and a user at one computer, often called a client, may wish to access information at multiple other computers, often called servers, via a network. Searching is the primary mechanism used to retrieve information from the Internet. Users typically search the web pages of the Internet using a search engine, such as AltaVista, Yahoo, or Google. These search engines index hundreds of millions of web pages and respond to tens of millions of queries every day.

To accomplish this formidable task, search engines typically employ three major elements. The first is an agent, often called a spider, robot, or crawler. The crawler visits a web page, reads it, and then follows links to other pages within the site. The crawler typically returns to the site on a regular basis, such as every month or two, to look for changes. The crawler stores the information it finds in the second part of the search engine, which is the index. Sometimes new pages or changes that the crawler finds may take some time to be added to the index. Thus, a web page may have been "crawled" but not yet "indexed." Until the web page has been added to the index, the web page is not available to those searching with the search engine. Search engine software is the third part of a search engine. This is the program that interrogates the millions of pages recorded in the pre-created index to find matches to a search and ranks them in order of what the program believes is most popular, which is often referred to as the page rank. Page rank is extremely important to the user because a simple search using common terms may match thousands or even tens of thousands of pages, which would be virtually impossible for the user to individually sort through in an attempt to determine which pages best serves the user's needs.

In order to aid the user, search engines typically determine relevancy by following a set of rules, which are commonly known as an page-ranking algorithm. Exactly how a particular search engine's algorithm works is usually a closely-kept trade secret. But, all major search engines follow the same generally-accepted methods described below. One of the main methods in a page-ranking algorithm involves the location and frequency of keywords on a web page, which is known as the location/frequency method. For example, page-ranking algorithms often assume that terms appearing in a title control-tag are more relevant than terms appearing in other locations in the page. Further, many page-ranking algorithms will also check to see if the search keywords appear near the top of a web page, such as in the headline or in the first few paragraphs of text. They assume that any page relevant to the topic will mention those words at the beginning. Frequency of terms is the other major factor that page-ranking algorithms use to determine relevancy. The page-ranking algorithm analyzes how often keywords appear in relation to other words in a web page and deems more relevant those with a higher frequency.

In addition to the location/frequency method, which is an on-the-page ranking criteria, search engines also typically make use of off-the-page ranking criteria. Off-the-page factors are those that use data external to the page itself. Chief among these is link analysis. By analyzing how pages link to each other, the page-ranking algorithm attempts to determine both the subject of a page and the relative importance of the page with respect to other pages.

Although link analysis works reasonably well for web pages created in HTML (Hypertext Markup Language), many web pages today contain animated graphics files, which are created, for example, via Macromedia Flash technology. The animated graphics files typically contain a sequences of frames, which when displayed in succession give the appearance of a moving picture. Links or buttons may be embedded in the frames, and crawlers have difficulty finding the embedded links, which makes the off-the-page ranking criteria less valuable than in the HTML case.

In an attempt to address this problem, frame development studios that generate animated graphics files often scan the files for embedded links and embed empty links to the pages in the HTML file that encapsulate the animated graphics files. Unfortunately, while these embedded links help the crawler to jump past the animated graphics files, they do not allow the crawlers to access the data within the animated graphics files themselves. Further, animated graphics files cannot be converted to HTML to allow for crawling because animations encompass the additional dimension of time that cannot be represented in a single HTML document.

Thus, without a better way to provide for the crawling of animated graphics files, search engines will not be able to properly rank search results, which users rely on as a helpful tool for determining relevance.

SUMMARY

A method, apparatus, system, and signal-bearing medium are provided that, in an embodiment, determine a term score based on frame scores, frame weights, and effect bonuses. The frame score represents a probability that the frame will be displayed, and in an embodiment is based on whether the frame may be skipped via an embedded link between frames. Frames that may be skipped have their frame scores reduced. The frame weights are based on an attribute of the term, such as a font size, a font style, a color, or a location within a frame. The effect bonus is based on one or more attributes of the nearest tweened object to the term, such as a location, a size, a shape, or a color. The term score may be used to order the display of the pages that contain the frames in response to a search request. In this way, terms within the frames of an animated graphics file are scored based on the likelihood that the term will be seen during the animation.

DETAILED DESCRIPTION

Figure 1:
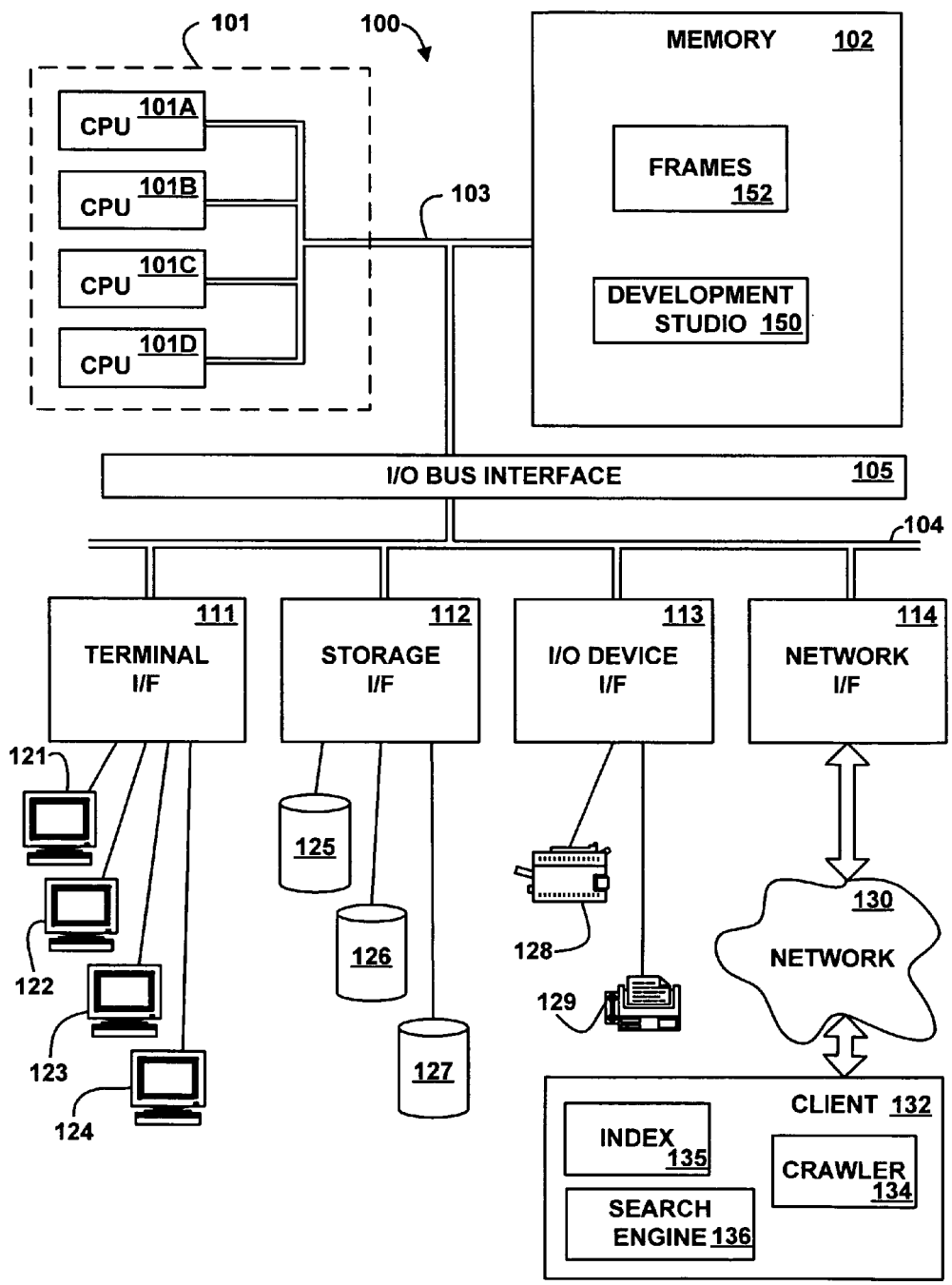
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a client 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a development studio 150 and frames 152. Although the development studio 150 and the frames 152 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the development studio 150 and the frames 152 are illustrated as being contained within the main memory 102, these elements are not necessarily all completely contained in the same storage device at the same time.

In an embodiment, the development studio 150 includes instructions capable of executing on the processor 101 or statements capable of being interpreted by instructions executing on the processor 101 to perform the functions as further described below with reference to FIGS. 4, 5, and 6. In another embodiment, the development studio 150 may be implemented in microcode. In another embodiment, the development studio 150 may be implemented in hardware via logic gates and/or other appropriate hardware techniques.

The development studio 150 creates the frames 152, which when played or presented implement an animated graphic image. The development studio 150 further calculates term scores for terms in the frames 152 and stores the term scores in the frames 152, as further described below with reference to FIGS. 4, 5, and 6.

In various embodiments, the frames 152 may be embedded in an unillustrated web page or may be entities unto themselves. In an embodiment, the frames 152 are played at the rate of 12 frames per second, but in other embodiments the frames may be played at any appropriate rate. In an embodiment, the animations in the frames 152 are vector-based graphics, so that information about text and other content is present in a form that can be recognized as text, but in other embodiments the frames 152 may contain pixel information, or any other appropriate type of information. The frames 152 are further described below with reference to FIGS. 2A and 2B.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3× specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 includes a crawler 134, an index 135, and a search engine 136. The crawler 134 interrogates servers attached to the network 130 in order to index their contents (e.g., the frames 152) into the index 135. The search engine 136 uses the index 135 to perform searches in response to search requests. The client 132 may also include any or all of the hardware and/or software elements previously described above for the computer system 100. In the example shown in FIG. 1, the crawler 134 interrogates the frames 152 and finds the term scores embedded in the frames 152, which the crawler 134 uses in its page-ranking algorithm. In another embodiment, the crawler 134 interrogates the frames and calculates the term scores. The processing of the crawler 134 and the search engine 136 is further described below with reference to FIG. 7.

It should be understood that FIG. 1 is intended to depict the representative major components of the computer system 100, the network 130, and the client 132 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
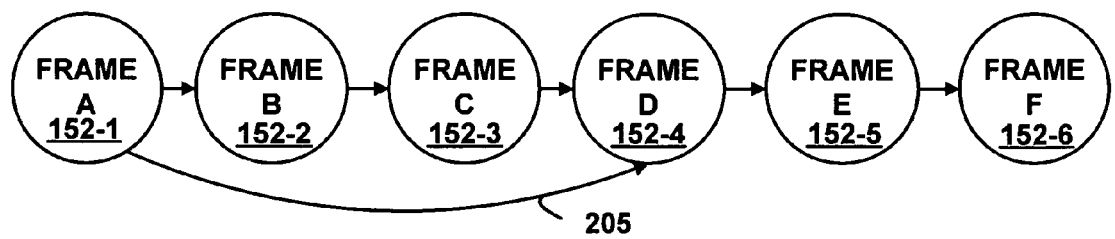
FIG. 2A depicts a block diagram of frames representing an animated graphical image with a single embedded button, according to an embodiment of the invention.

FIG. 2A depicts a block diagram of the frames 152 representing an animated graphical image with a single embedded button 205, according to an embodiment of the invention. Illustrated are frames 152-1, 152-2, 152-3, 152-4, 152-5, and 152-6, which are examples of select frames within the frames 152 (FIG. 1). When the frames 152-1, 152-2, 152-3, 152-4, 152-5, and 152-6 are displayed or played in succession (e.g., at 12 frames per second or at any other appropriate rate), the user sees a moving picture. In addition to being played in order, the frames may also be played out-of-order, via selection of embedded buttons or links in the frames. In the example shown, selection of a button 205 embedded in the frame A 152-1 causes play of the frames to jump from the frame A 152-1 to the frame D 152-4, which causes display of the in-between frames 152-2 and 152-3 to be skipped. Although the button 205 is illustrated in FIG. 2A as if it can only be selected from a single frame, buttons may in fact be capable of being selected from multiple frames. Further, any number of frames may be present; additional frames may be present between the illustrated frames 152-1, 152-2, 152-3, 152-4, 152-5, and 152-6; buttons may be present in any frame; and selection of the buttons may cause play to jump to any other frame. The frames 152 may include control logic that stops the animation at a given frame, allowing users to select buttons to continue the animation.

Figure 2B:
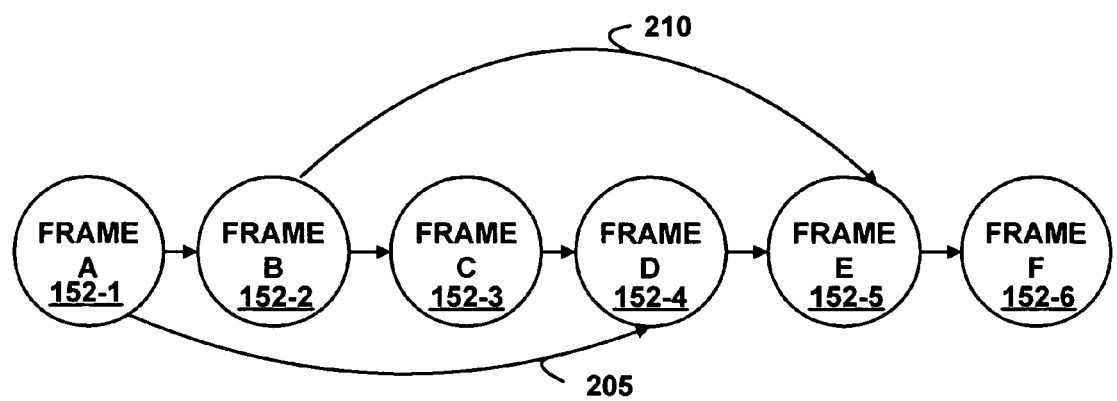
FIG. 2B depicts a block diagram of frames representing an animated graphical image with multiple embedded buttons, according to an embodiment of the invention.

FIG. 2B depicts a block diagram of the frames 152 representing an animated graphical image with multiple embedded buttons 205 and 210, according to an embodiment of the invention. Illustrated are frames 152-1, 152-2, 152-3, 152-4, 152-5, and 152-6, which are examples of the frames 152 (FIG. 1). In the example shown, selection of the button 205 embedded in the frame A 152-1 causes play of the frames to jump from the fame A 152-1 to the frame D 152-4. Also, selection of the button 210 embedded in the frame B causes play of the frames to jump from the frame B 152-2 to the frame E 152-5.

Figure 3A:
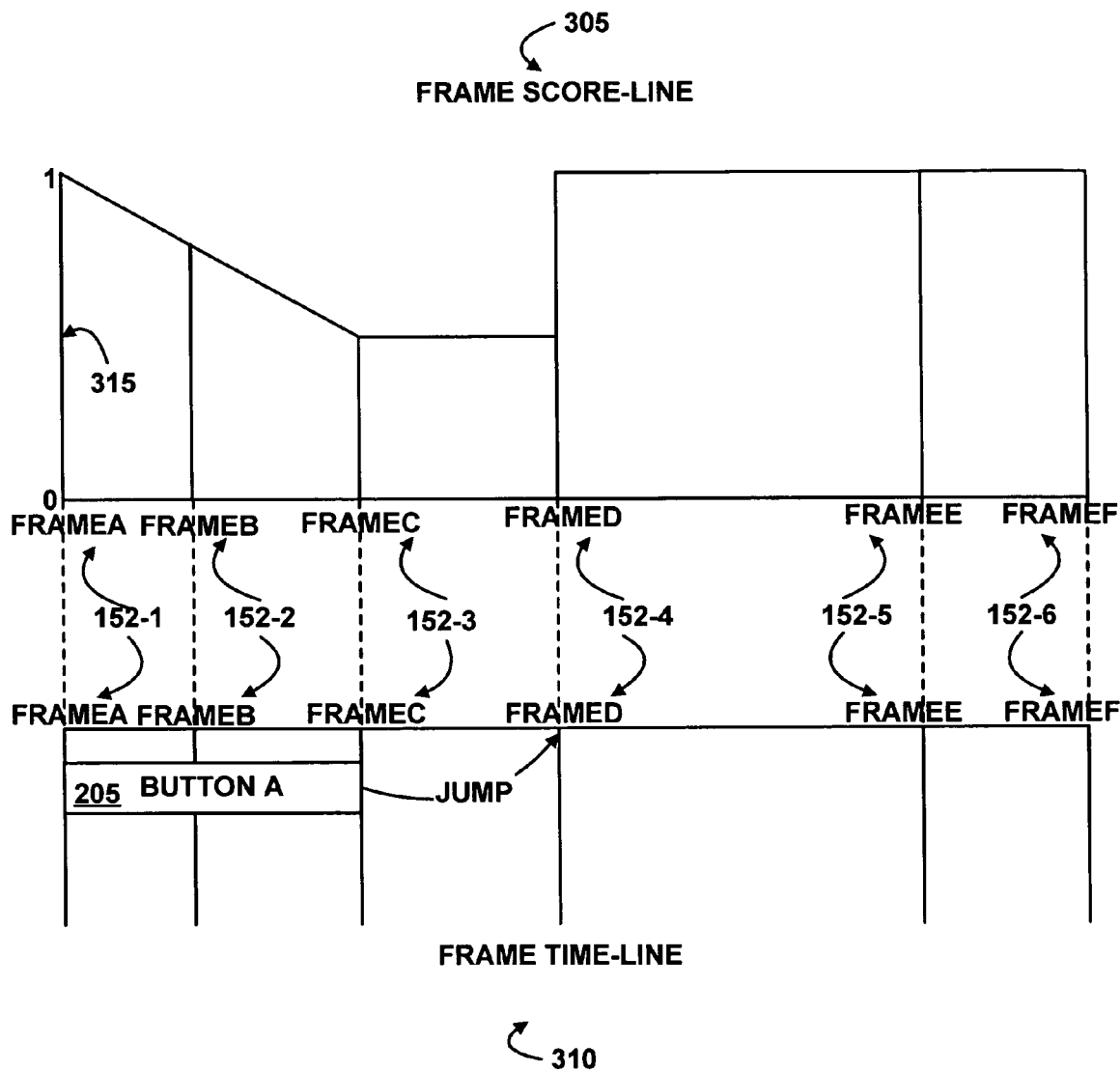
FIG. 3A depicts a graphical representation of a frame score-line and a frame time-line for frames with a single embedded button, according to an embodiment of the invention.

FIG. 3A depicts a graphical representation of a frame score-line 305 and a frame time-line 310 for the example frames 152-1, 152-2, 152-3, 152-4, 152-5, and 152-6 with the single button 205, as previously illustrated above with reference to FIG. 2A, according to an embodiment of the invention. The frame score-line 305 graphically illustrates how the frame score changes over time. The frame score represents the likelihood or probability that the frame will be seen by the viewer. The frame scores range from 0 to 1 on the vertical axis 315 of the frame score-line 305, but in other embodiments any appropriate score range may be used.

Buttons, such as the button A 205 effects the control transfer between frames, so they also effect the frame score. The button A 205 appears at the frame A 152-1 and disappears at the frame C 152-3. Selection of the button A 205 causes the play of the current frame to cease and play to restart at (jump to) the frame D 152-4, so that the intervening frames are skipped and not displayed for viewing. Frames that may potentially be skipped and not viewed (depending on whether the embedded link or button is selected) are given a lower frame score, as further described below.

The development studio 150 reduces the frame score of a sequence of frames containing a button as the sequence progresses and adds back the amount of the reduction when the target of the button is reached. Using the example of FIG. 3A, the development studio 150 starts the frame score at "1" at the frame A 152-1 and reduces the frame score as the frames progress because of the existence of the embedded button A 205 in the frames 152-1 through the frames 152-2 and 152-3, which creates the possibility that the user will select the button A 205 and skip past, and not view, the current frames. When the button A 205 no longer exists after the frame C 152-3, the reduction in the frame score ceases, and the frame score remains constant because users no longer have an opportunity to escape the successive in-order viewing of the frames. When the target of the button is reached, in this example the frame D 152-4, the development studio 150 adds back to the frame score the amount by which the frame score was previously reduced due to the existence of the button A 205, which restores the frame score to "1" at the frame D 152-4. (A frame score of "1" means the probability that the frame will be displayed for viewing is 100%, or a certainty.) The frame score then remains constant at "1" through the frames 152-5 and 152-6 since they contain no buttons, in this example.

Figure 3B:
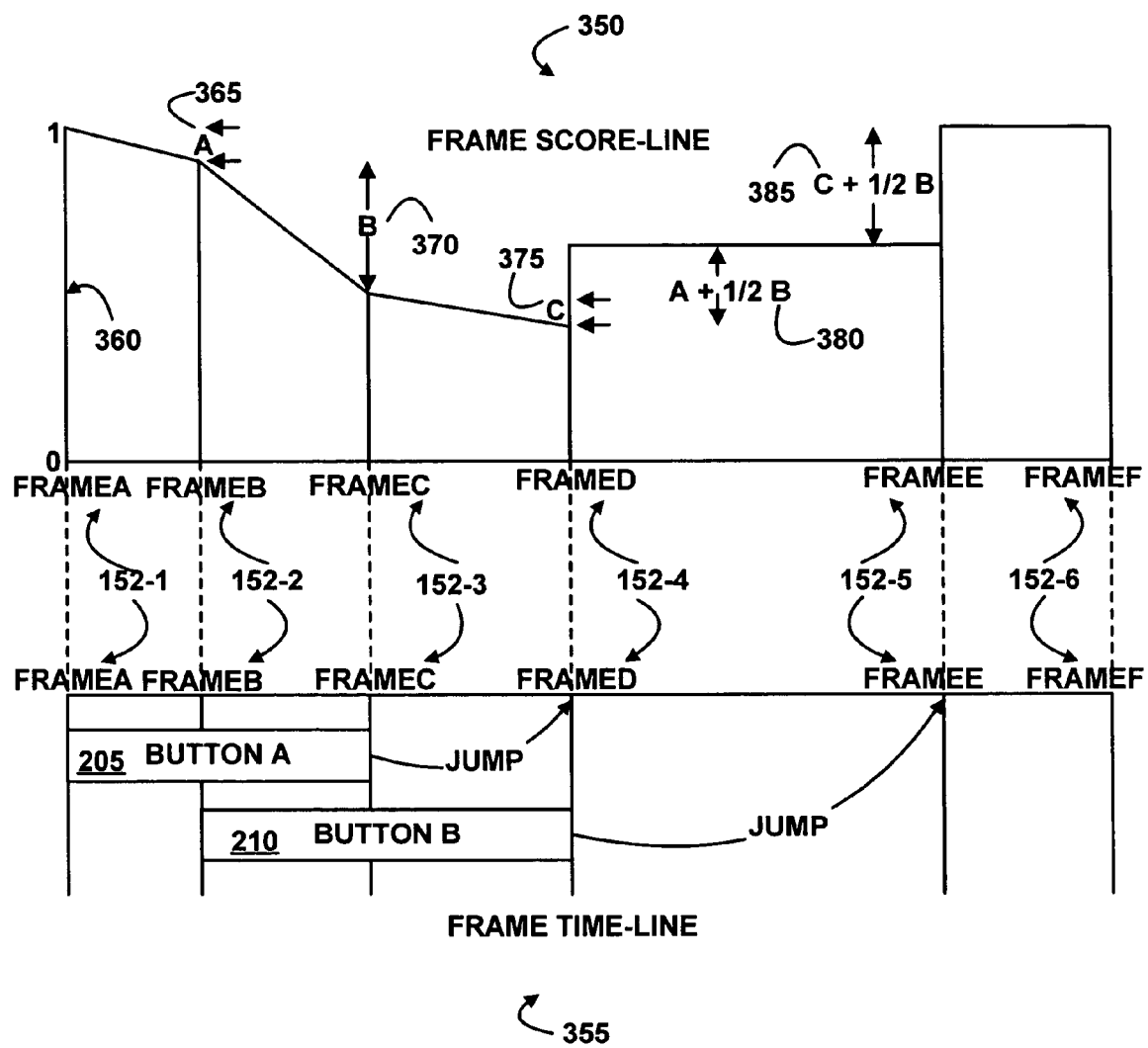
FIG. 3B depicts a graphical representation of a frame score-line and a frame time-line for frames with multiple embedded buttons, according to an embodiment of the invention.

FIG. 3B depicts a graphical representation of a frame score-line 350 and a corresponding frame time-line 355 with multiple buttons 205 and 210 for the example frames 152-1, 152-2, 152-3, 152-4, 152-5, and 152-6, as previously illustrated above with reference to FIG. 2B, according to an embodiment of the invention.

The frame score-line 350 graphically illustrates how the frame score changes over time. The frame score represents the likelihood or probability that the frame will be seen by the viewer. The frame scores range from 0 to 1 on the vertical axis 360 of the frame score-line 350, but in other embodiments any appropriate score range may be used.

The buttons 205 and 210 effect the control transfer between frames, so the development studio 150 changes the frame score based on the buttons 205 and 210. The button A 205 appears at the frame A 152-1 and disappears at the frame C 152-3. Selection of the button A 205 causes the play of the current frame to cease and play to restart at (jump to) the frame D 152-4. The button B 210 appears at the frame B 152-2 and disappears at the frame D 152-4. Selection of the button B 210 causes play of the current frame to cease and play to restart at (jump to) the frame E 152-5.

The development studio 150 starts the frame score at "1" at the frame A 152-1 and reduces the frame score as the frames progress because of the existence of the button A, which causes a likelihood that the user will skip past, and not view, the current frames. Thus, by the frame B 152-2, the development studio 150 reduces the frame score by the amount A 365.

Starting at the frame B 152-2, the button B 210 is also present, so the development studio 150 decreases the frame score faster (by an amount B 370) between the frame B 152-2 and the frame C 152-3 than it did between the frame A 152-1 and the frame B 152-2 (by the amount A 365). The frame score is reduced faster because the reduction amount B is the result of both the button A 205 and the button B 210, giving more opportunities to skip the display of frames.

Starting at the frame C 152-3, only the button B 210 is present, so the development studio 150 decreases the frame score once again at a slower rate, up to an amount C 375 at the frame D 152-4.

Upon reaching the frame D 152-4, the development studio 150 increases the frame score by an amount (A+½ B) 380, which is the amount of the previous decrease in the frame score that was related to the appearance of the button A 205. The development studio 150 increases the frame score upon reaching the frame D 152-4 because the frame D 152-4 is the target of the button A 205, so the possibility of skipping frames due to the button A 205 no longer exists.

Upon reaching the frame E 152-5, the development studio 150 increases the frame score by an amount (C+½ B) 385, which is the amount of the previous decrease in the frame score that was related to the appearance of the button B 210. The frame score is now back to "1" because there is no embedded button that skips frame E 152-5 and frame F 152-6.

Although the increases and decreases of the frame score are illustrated in FIGS. 3A and 3B as being linear, in other embodiments they are not linear. In an embodiment, the slope of the decrease of the frame score is proportional to the score of the button. For example, a button that is barely visible on the screen will probably be selected less frequently that a button in the middle of the screen.

Figure 4:
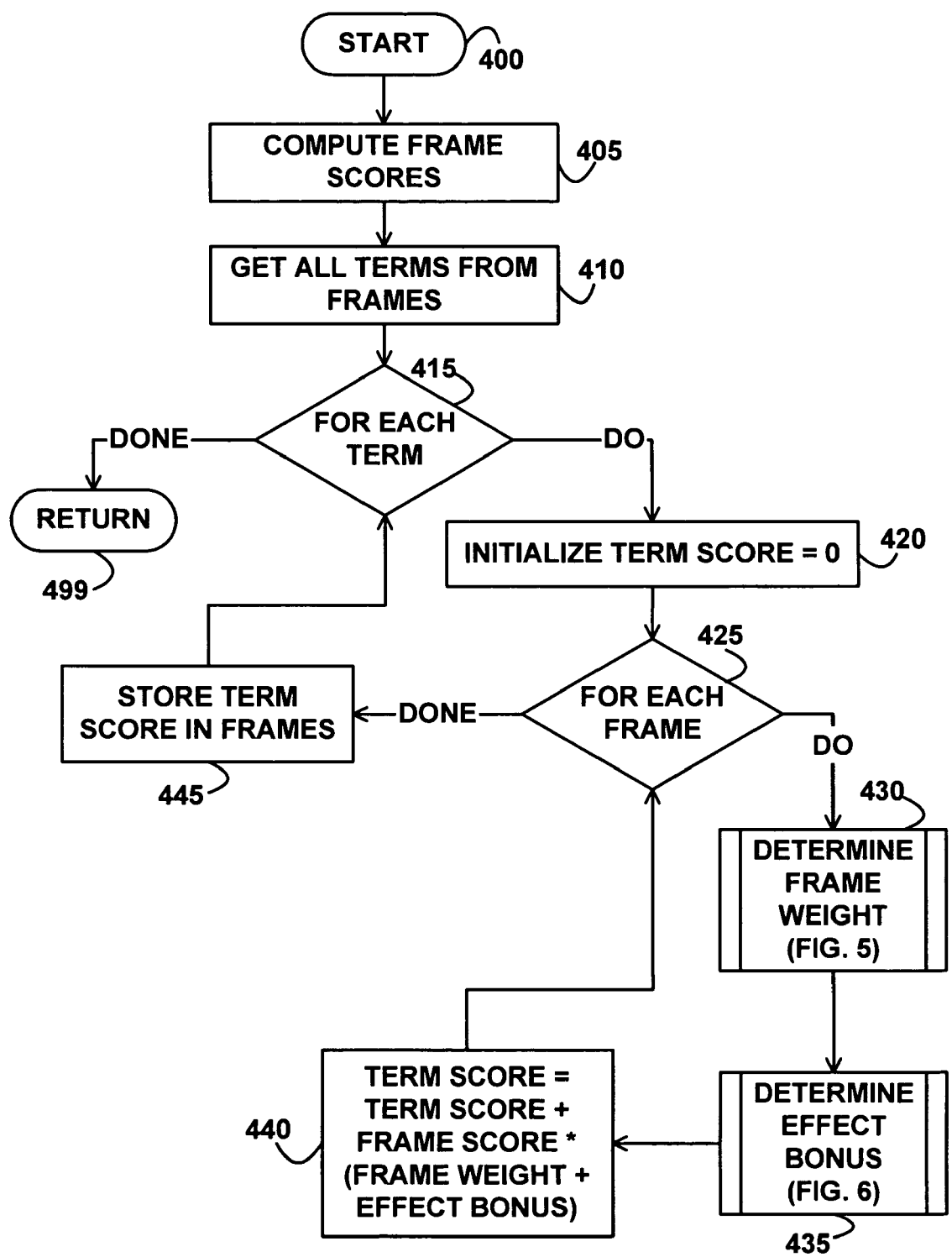
FIG. 4 depicts a flowchart of example processing for determining term scores for terms in a frame, according to an embodiment of the invention.

FIG. 4 depicts a flowchart of example processing for determining term scores for terms in the frames 152, according to an embodiment of the invention. Control begins at block 400. Control then continues to block 405 where the development studio 150 computes frame scores for the frames 152, as previously described above with reference to FIGS. 3A and 3B. The frame score is the likelihood that the frame will be displayed during presentation of the frames 152.

Control then continues to block 410 where the development studio 150 retrieves all terms from the frames 152. In various embodiments, a term may be a word, a phrase, or any other searchable object. Control then continues to block 415 where the development studio 150 starts a loop executed for each term. So long as a term exists that is unprocessed by the logic of FIG. 4, control continues from block 415 to block 420 where the development studio 150 initializes the term score for the current term being processed by the loop to zero.

Control then continues to block 425 where the development studio 150 enters a loop that is executed once for each frame in the frames 152. As long as a frame exists that is unprocessed by the loop, control continues from block 425 to block 430 where the development studio 150 determines the frame weight of the current frame, as further described below with reference to FIG. 5. The frame weight is a score related to the prominence of a term within the frame based on the term's location within the frame, font size, font style, color of the term versus the background, or occlusion.

Control then continues to block 435 where the development studio 150 determines an effect bonus, as further described below with reference to FIG. 6. The effect bonus is the likelihood that the term will be viewed during the frame because of movement or fading of the objects elsewhere in the frame. Control then continues to block 440 where the development studio 150 calculates the current term score to be the term score plus the frame score multiplied by the (frame weight plus the effect bonus). Control then returns to block 425, as previously described above.

When the loop that starts at block 425 has processed all the frames, control continues from block 425 to block 445 where the development studio 150 stores the term score in the frames 152. The crawler 134 (FIG. 1) uses the stored term score plus other information from the found pages to create the index 135 (FIG. 1), which is used by the search engine 136 (FIG. 1) to rank or sort the page that contains the frames 152 with respect to other frames or pages when the search engine 136 responds to search requests, as further described below with reference to FIG. 7. Control then returns to block 415, as previously described above.

When the loop that starts at block 415 has processed all the terms, control continues from block 415 to block 499 where the logic of FIG. 4 returns.

Figure 5:
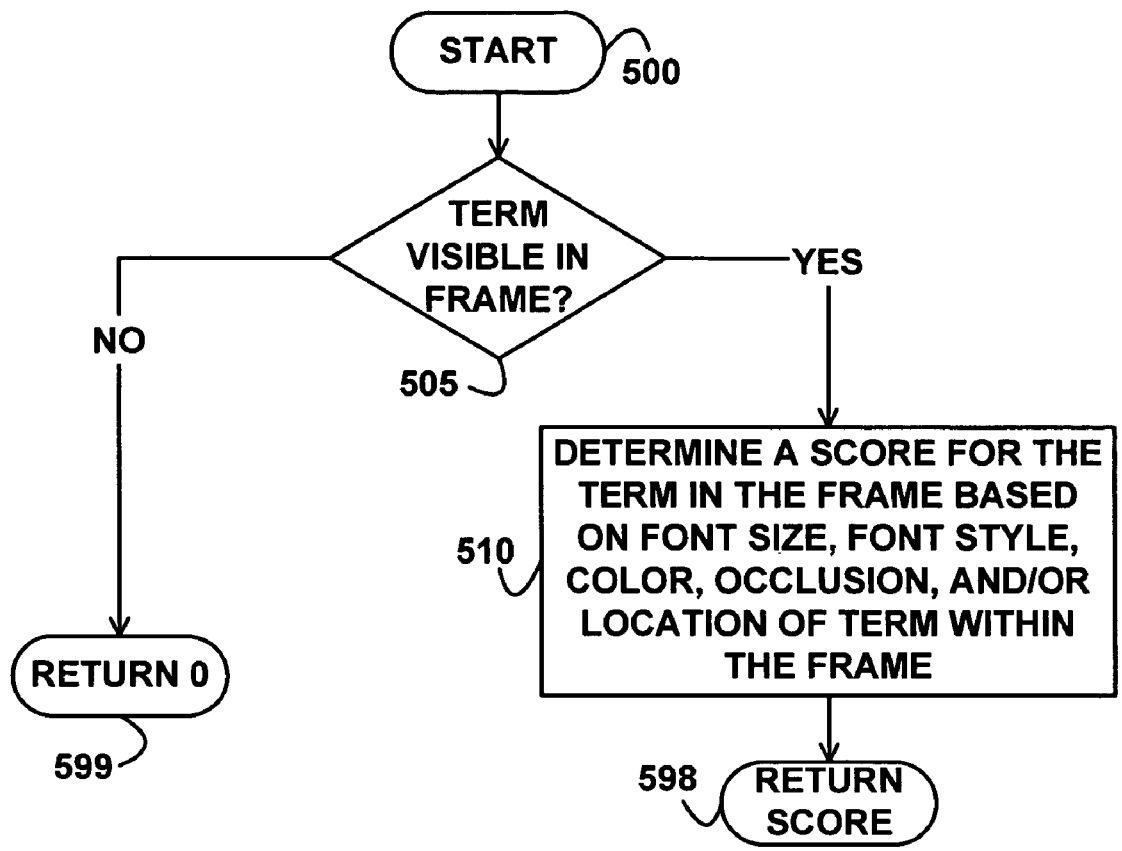
FIG. 5 depicts a flowchart of example processing for determining a frame weight, according to an embodiment of the invention.

FIG. 5 depicts a flowchart of example processing for determining a frame weight, according to an embodiment of the invention. Control begins at block 500. Control then continues to block 505 where the development studio 150 determines whether the current term is visible in the current frame. If the determination at block 505 is true, then control continues to block 510 where the development studio 150 determines a score for the term in the frame based on the font size of the term, the font style of the term, the color of the term, the location of the term within the frame, and/or occlusion of the term. If the term is occluded by another object on higher layers, its score is lowered proportional to the coverage. Control then continues to block 598 where the score is returned as the frame weight.

If the determination at block 505 is false, then the term is not visible in the frame, so control continues to block 599 where zero is returned as the frame weight.

Figure 6:
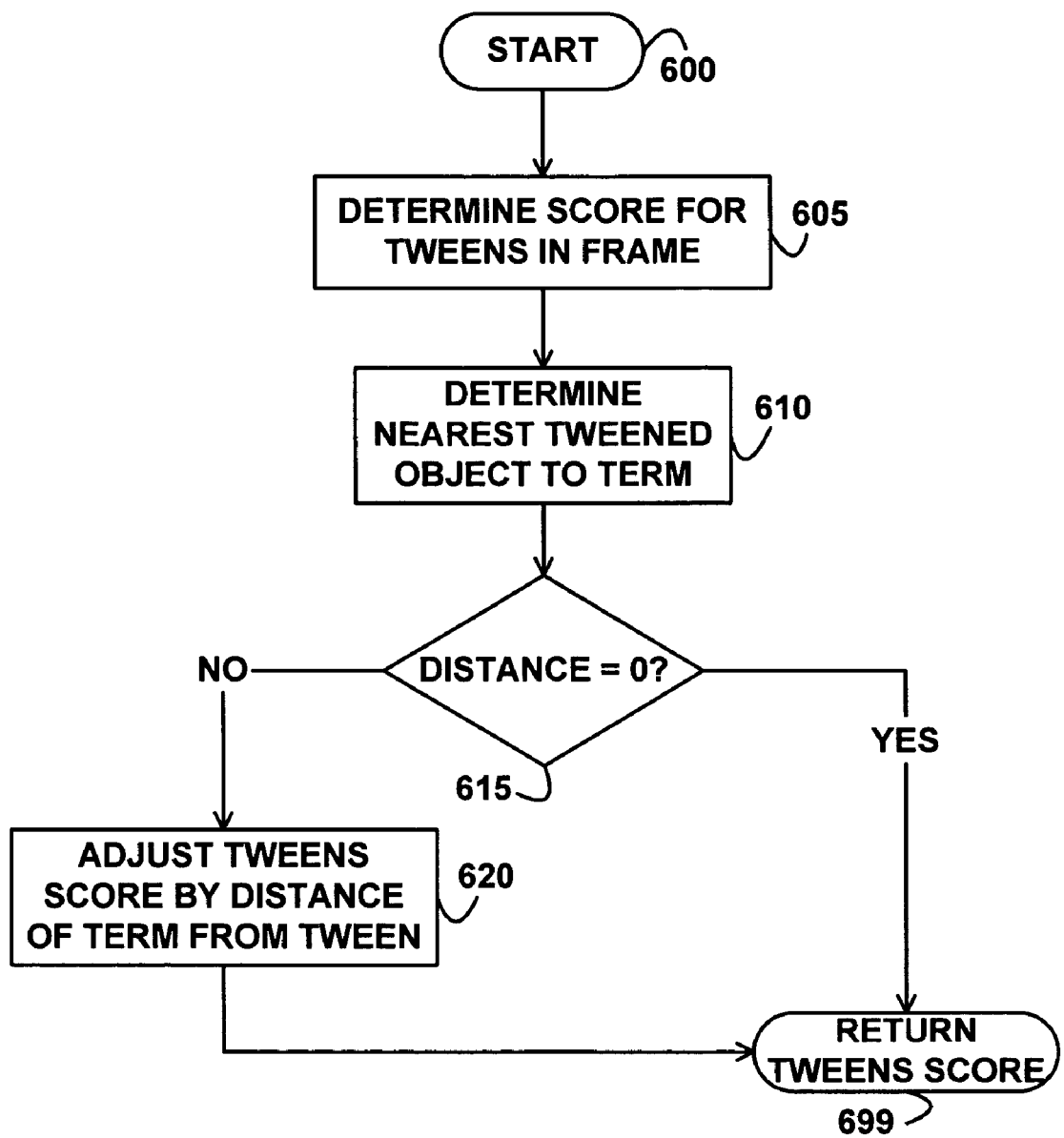
FIG. 6 depicts a flowchart of example processing for determining an effect bonus, according to an embodiment of the invention.

FIG. 6 depicts a flowchart of example processing for determining an effect bonus, according to an embodiment of the invention. Control begins at block 600. Control then continues to block 605 where the development studio 150 determines a score for "tweened" objects in the current frame based on the location, size, shape, and/or color of the tweened objects. The term "tween" has its origins in the phrase "in between." With tweening, the designer of the frames 152 specifies a tweened object with a beginning location in a beginning frame and an ending location in an ending frame. In response, the development studio 150 creates the frames in between (hence "tween") the beginning frame and the ending frame to result in a smooth animation that moves the tweened object from the beginning location to the ending location. In various embodiments, in addition to or instead of location, the development studio 150 may tween the size, shape, and/or color of the objects. In addition to making the development process easier for the designer of the frames 152, tweening helps reduce the file size of the frames 152 because only information about the tweened objects at the beginning and ending frames is saved and not the frames in-between.

Control then continues to block 610 where the development studio 150 determines the nearest tweened object to the current term. Control then continues to block 615 where the development studio 150 determines whether the distance from the term to the nearest tweened object is zero. If the determination at block 615 is true, then the distance from the term to the nearest tweened object is zero, so control continues to block 699 where the tweens score is returned.

If the determination at block 615 is false, then the distance from the term to the nearest tweened object is not zero, so control continues to block 620 where the development studio 150 adjusts the tweens score by the distance of the term to the nearest tweened object. Control then continues to block 699 where the tweens score is returned.

Although FIGS. 4, 5, and 6 were previously described above with the development studio 150 performing the processing, in another embodiment, the crawler 134 may perform the processing, as further described below with reference to FIG. 7.

Figure 7:
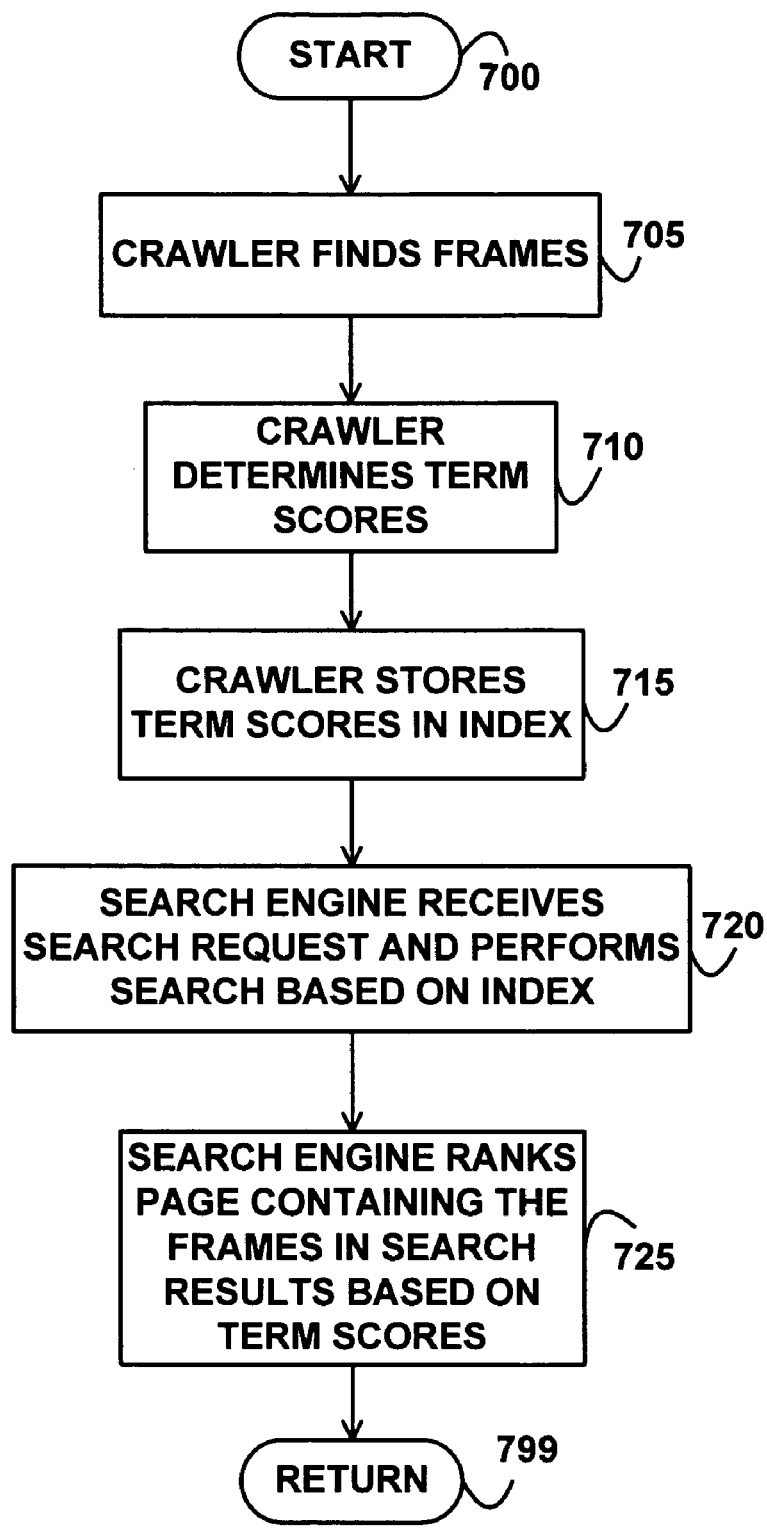
FIG. 7 depicts a flowchart of example processing for performing searches and ranking the results based on term scores, according to an embodiment of the invention.

FIG. 7 depicts a flowchart of example processing for performing searches and ranking the results based on term scores, according to an embodiment of the invention. Control begins at block 700. Control then continues to block 705 where the crawler 134 searches the network 130 for pages and finds the frames 152. Control then continues to block 710 where the crawler 134 determines term scores for terms in the frames 152 using analogous processing to that previously described above with reference to FIGS. 4, 5, and 6. In another embodiment, the crawler retrieves pre-existing term scores from the frames 152.

Control then continues to block 715 where the crawler stores the term scores in the index 135. Control then continues to block 720 where the search engine 136 receives a search request and performs the search using the index 135. Control then continues to block 725 where search engine ranks, sorts, or orders the pages containing the frames in the search results based on the term scores. Control then continues to block 799 where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   determining a plurality of frame scores for each of a plurality of respective frames, wherein the plurality of respective frames, when displayed, form animated graphic images, wherein the determining the plurality of frame scores further comprises determining the plurality of frame scores to be a plurality of probabilities that the plurality of respective frames will be displayed based on at least one embedded link between two of the plurality of frames, wherein the determining the plurality of frame scores based on at least one embedded link further comprises reducing the frame scores for a subset of the plurality of frames that is skipped by the embedded link;
   determining a plurality of frame weights for a term in each of the plurality of frames, wherein the plurality of frame weights comprise scores of prominence of the term in the plurality of frames;
   determining a plurality of effect bonuses for the term in each of the plurality of frames;
   determining a term score for the term based on the plurality of frame scores, the plurality of frame weights, and the plurality of effect bonuses, wherein the determining the term score for the term further comprises assigning the term score for the term to be a summation of the plurality of frame scores multiplied by a sum of the plurality of frame weights and the plurality of effect bonuses; and
   displaying pages that contain the frames containing the term in an order based on the term score in response to a search request.

2. The method of claim 1, wherein the determining the plurality of frame weights further comprises:
   determining the plurality of frame weights based on an attribute selected from a group consisting of: a font size of the term, a font style of the term, a color of the term, occlusion of the term, and a location of the term.

3. The method of claim 1, wherein the determining the effect bonus further comprises:
   determining the effect bonus based on a nearest tweened object to the term.

4. The method of claim 1, further comprising:
   storing the term score in the plurality of frames.

5. An apparatus comprising:
   means for determining a plurality of frame scores for each of a plurality of respective frames, wherein the plurality of respective frames, when displayed, form animated graphic images, and wherein the means for determining the plurality of frame scores further comprises means for determining the plurality of frame scores to be a plurality of probabilities that the plurality of respective frames will be displayed based on at least one embedded link between two of the plurality of frames, wherein the means for determining the plurality of frame scores based on at least one embedded link further comprises means for reducing the frame scores for a subset of the plurality of frames that is skipped by the embedded link;
   means for determining a plurality of frame weights for a term in each of the plurality of frames, wherein the plurality of frame weights comprise scores of prominence of the term in the plurality of frames;
   means for determining a plurality of effect bonuses for the term in each of the plurality of frames;
   means for determining a term score for the term based on the plurality of frame scores, the plurality of frame weights, and the plurality of effect bonuses, wherein the means for determining the term score for the term further comprises assigning the term score for the term to be a summation of the plurality of frame scores multiplied by a sum of the plurality of frame weights and the plurality of effect bonuses; and
   a display device displaying pages that contain the frames containing the term in an order based on the term score in response to a search request.

6. The apparatus of claim 5, wherein the means for determining the effect bonus further comprises:
   means for determining the effect bonus based on a nearest tweened object to the term.

7. The apparatus of claim 5, further comprising:
   means for storing the term score in the plurality of frames.

8. The apparatus of claim 5, wherein the means for determining the plurality of frame weights further comprises:
   means for determining the plurality of frame weights based on at least one attribute selected from a group consisting of: a font size of the term, a font style of the term, a color of the term, occlusion of the term, and a location of the term.

9. A storage medium encoded with instructions, wherein the instructions when executed comprise:
   determining a plurality of frame scores for each of a plurality of respective frames, wherein the plurality of respective frames, when displayed, form animated graphic images, and wherein the determining the plurality of frame scores further comprises determining the plurality of frame scores to be a plurality of probabilities that the plurality of respective frames will be displayed based on at least one embedded link between two of the plurality of frames, wherein the determining the plurality of frame scores based on at least one embedded link further comprises reducing the frame scores for a subset of the plurality of frames that is skipped by the embedded link;

determining a plurality of frame weights for a term in each of the plurality of frames, wherein the plurality of frame weights comprise scores of prominence of the term in the plurality of frames;

determining a plurality of effect bonuses for the term in each of the plurality of frames; and determining a term score for the term based on the plurality of frame scores, the plurality of frame weights, and the plurality of effect bonuses, wherein the determining the term score for the term further comprises assigning the term score for the term to be a summation of the plurality of frame scores multiplied by a sum of the plurality of frame weights and the plurality of effect bonuses; and displaying pages that contain the frames containing the term in an order based on the term score in response to a search request.

10. The storage medium of claim 9, further comprising: storing the term score in the plurality of frames.

11. The storage medium of claim 9, wherein the determining the plurality of frame weights further comprises:

determining the plurality of frame weights based on an attribute selected from a group consisting of a font size of the term, a font style of the term, a color of the term, occlusion of the term, and a location of the term.

12. The storage medium of claim 9, wherein the determining the effect bonus further comprises:

determining the effect bonus based on a nearest tweened object to the term.

13. A computer system comprising:

a processor; and a main memory encoded with instructions, wherein the instructions when executed on the processor comprise:

determining a plurality of frame scores for each of a plurality of respective frames, wherein the plurality of respective frames, when displayed, form animated graphic images, and wherein the determining the plurality of frame scores further comprises determining the plurality of frame scores to be a plurality of probabilities that the plurality of respective frames will be displayed based on at least one embedded link between two of the plurality of frames, wherein the determining the plurality of frame scores based on at least one embedded link further comprises reducing the frame scores for a subset of the plurality of frames that is skipped by the embedded link, determining a plurality of frame weights for a term in each of the plurality of frames, wherein the plurality of frame weights comprise scores of prominence of the term in the plurality of frames, determining a plurality of effect bonuses for the term in each of the plurality of frames, determining a term score for the term based on the plurality of frame scores, the plurality of frame weights, and the plurality of effect bonuses, wherein the determining the term score for the term further comprises assigning the term score for the term to be a summation of the plurality of frame scores multiplied by a sum of the plurality of frame weights and the plurality of effect bonuses, storing the term score in the plurality of frames, and displaying pages that contain the frames containing the term in an order based on the term score in response to a search request.

14. The computer system of claim 13, wherein the determining the plurality of frame weights further comprises:

determining the plurality of frame weights based on an attribute selected from a group consisting of: a font size of the term, a font style of the term, a color of the term, occlusion of the term, and a location of the term.

15. The computer system of claim 13, wherein the determining the effect bonus further comprises:

determining the effect bonus based on a nearest tweened object to the term.

16. The computer system of claim 13, wherein the determining the effect bonus further comprises:

determining the effect bonus based an attribute selected from a group consisting of: a location, a size, a shape, and a color of a nearest tweened object to the term.

\* \* \* \* \*